Patented Sept. 12, 1933

1,926,039

UNITED STATES PATENT OFFICE 1,926,039

CATALYST AND PROCESS FOR ACETYLENE POLYMERIZATION

Frederick B. Downing, Carneys Point, N. J., and Albert S. Carter, Wilmington, Del., and Donald Hutton, Carneys Point, N. J., assignors to E. I. du Pont de Nemours & Company, Wilmington, Del., a corporation of Delaware No Drawing. Application February 16, 1932
Serial No. 593,410

15 Claims. (Cl. 260—170)

This invention relates to new compositions suitable for catalyzing the polymerization of acetylene. More particularly, it relates to an improvement in the known processes which involve the use as the catalyst of certain new mixtures of cuprous salts which are capable of polymerizing acetylenic compounds to highly unsaturated non-benzenoid hydrocarbons having a molecular weight equal to two or more times that of the original substance. Specifically, the present improvement involves the substitution of high boiling solvents for the water of the catalysts employed heretofore and described below.

Prior art

In a patent of J. A. Nieuwland, United States 1,811,959, a process has been described for carrying out the polymerization of acetylene in the presence of a suitable catalyst, to form unsaturated nonbenzenoid hydrocarbons such as vinylacetylene, divinylacetylene, etc. In this process, the acetylene is polymerized when introduced into a catalyst comprising solutions of a cuprous compound, such as cuprous chloride, which solutions preferably are saturated and contain finely divided copper and a salt of a nitrogenous base such as ammonium chloride.

In an application of Calcott and Downing, Serial No. 303,494, filed September 1, 1928, is disclosed a method for the continuous production of acetylene polymers by the use of a catalyst of the type discovered by Nieuwland. In the latter application, acetylene is introduced continuously into the heated catalyst, the resulting polymers are continuously removed together with unreacted acetylene, the entrained acetylene then separated and reintroduced into the catalyst.

A recent application of Julius A. Nieuwland, Serial No. 505,463, filed December 29, 1930, discloses an improvement in the original aqueous catalyst designed to increase its working life, in which an inorganic acid is added in suitable concentration to the aqueous mixture. In an application by Nieuwland and Vogt, Serial No. 505,462, filed December 29, 1930, the use of organic acids in place of part or all of the water has been disclosed.

For the inorganic acid constituent which is the feature of the Nieuwland application, Serial No. 505,463, an inorganic acid may be used which does not form a cuprous salt which is insoluble in a saturated aqueous solution of the desired amine or ammonium salt to be used in the catalyst, and which has an ionization constant of $10^{-6}$ or greater. Mixtures of acids may be employed if desired. Such acids as the following can, for example, be used: hydrochloric, hydrobromic, hydriodic, sulfuric, phosphoric, etc. The acid should be added to the catalyst in sufficient quantity to form the salt with any free nitrogenous base present and in sufficient excess to establish an hydrogen ion concentration of greater than pH 6, and preferably not in excess of that quantity equivalent to any free amine which may be present plus a sufficient quantity of acid to furnish ionizable hydrogen equal to 0.2% of the weight of the cuprous copper in the system. Thus, if a catalyst be made containing 45 parts of cuprous copper (as 70 parts cuprous chloride) and the proper amount of water, copper powder and ammonium chloride, acid may be added to furnish not over 0.09 parts of ionizable hydrogen since there is no free amine in the system. The 0.09 parts of ionizable hydrogen might be furnished by 8.88 parts of commercial 37% hydrochloric acid, for example.

Carter and Downing, application Serial No. 538,920, filed May 21, 1931, have described a process of manufacture especially designed to facilitate the selective production and separation of the various polymers of acetylene in high yields, and to avoid the formation of undesirable polymers.

The products resulting from polymerizing acetylene as disclosed in these prior applications comprise higher hydrocarbons of the acetylene series such as $C_4H_4$, $C_6H_6$ and $C_8H_8$; these have been identified to be essentially vinylacetylene, $CH_2=CH—C\equiv CH$, boiling range 4-8° C., divinylacetylene, $CH_2=CH—C\equiv C—CH=CH_2$, boiling 83-5° C., 1, 5, 7-hexatriene-3-ine, $CH_2=CH—C\equiv C—CH=CH—CH=CH_2$, and other isomers.

In the above applications, the catalyst is basically disclosed as a substantially saturated aqueous solution of a cuprous salt, finely divided copper and an ammonium or tertiary amine salt. To this solution may be added small amounts of inorganic acids, or the water may be replaced in whole or part by suitable organic acids, as desired.

It has been discovered, during the use of the catalysts described above which contain water, that the processes suffer from the disadvantage that, at the optimum operating temperature, the vapor pressure of water is high so that considerable water is volatilized and freezes in the low temperature condensers, if their temperature be below 0° C. The vaporization and condensation of this water is thermally inefficient and should be avoided if possible. Even in the case of the above cited Nieuwland and Vogt application where are disclosed methods of improving these catalysts by replacing part or all of the water by organic carboxylic acids, this feature is encountered so long as water is present in material quantities.

Description of invention

One object of this invention therefore is to minimize the use of water in the above described acetylene polymerization catalyst; a second object of the invention is to minimize the use of volatile constituents in the catalyst.

With these objects in view, we have discovered that a part or all of the water in any of the above cited catalysts may be replaced by means of certain non-aqueous solvents, particularly high boiling compounds. The operation with the catalysts so constituted may be carried out in the same manner as described by the previous patents, as will appear from the following examples. The new modified catalyst is especially adapted to the continuous processes, particularly the process of Carter and Downing, application Serial No. 538,920, where "freeze ups" due to water vapor are particularly troublesome.

The following examples will illustrate the general application of the improved catalysts.

Example 1

A catalyst composed of 17.8 parts of cuprous chloride, 6.9 parts of ammonium chloride, 3 parts of copper powder, 42.5 parts of ethylene glycol and 0.55 part of 38% hydrochloric acid is swept with acetylene and then shaken under an atmosphere of acetylene until absorption is complete. The characteristic yellow addition product is formed and after aging for several days, distillation yields a mixture containing vinylacetylene, divinylacetylene and a small amount of unreacted acetylene.

Example 2

Example 1 is repeated except that 37.5 parts of monobutyl ether of diethylene glycol are employed in place of ethylene glycol. A product similar to that of Example 1 was obtained.

Example 3

A catalyst is prepared containing 35.6 parts of cuprous chloride, 13.8 parts of ammonium chloride, 4 parts of metallic copper powder, 85 parts of glycerol and 1.1 parts of 38% hydrochloric acid. This was aged for a half hour at 50° C. with violent agitation and then a slow stream of acetylene was passed over it while the mixture was agitated and held at 50° C. The effluent gas was condensed at −70° C. and after boiling off the dissolved acetylene, it yielded practically pure vinylacetylene.

Example 4

A catalyst is prepared with the composition described above and introduced in a horizontal copper tube of approximately twice the volume of the catalyst solution. This tube, whose length is six times its diameter, is equipped with a horizontal agitator and so designed that it may be held at a constant temperature of from 45° to 100° C. The tube is heated to 50° to 60° and the catalyst solution aged for 24 hours under an atmosphere of nitrogen to insure that all of the copper is reduced to the cuprous state. This catalyst vessel is connected in series to a brine condenser held at 0 to 1° C., a separator capable of removing water from the gas stream (said water being returned to the catalyst tube), a condenser held at −60° to −70° by means of suitable refrigeration and a blower which returns the gas effluent from the condenser to the catalyst tube. The condenser is also connected with a still held at 0 to −5° from which vinylacetylene may pass into a storage tank at −15° and from which acetylene may be distilled through a packed column exhausting back into the acetylene-exit line from the condenser.

After the catalyst solution has been aged, the system is swept with acetylene which is introduced through a constant pressure device located at the blower. When the system is essentially free of nitrogen or other gases other than acetylene, agitation is started in the catalyst tube. Rapid absorption of the gas takes place; the blower is next put in operation. With a gas circulation rate of from 4 to 7 liters per minute per liter free space in the catalyst chamber, small quantities of water are condensed in the preliminary cooler (0° to 1° C.) which is continuously returned to the catalyst; a very small quantity of liquid by-products also collects in this cooler, particularly at first; these are continuously removed. Vinylacetylene saturated with acetylene is collected in the condenser (held at −60° to −70°), the vinylacetylene passing into the still where it is held for nearly an hour, while the acetylene is allowed to distill off and return to the system. Vinylacetylene is then tapped off for storage. The effluent from the condenser returning with fresh acetylene to the blower. Difficulties with "freeze ups" in the low temperature condensers are not experienced in this case as they are likely to be in the case of catalysts containing considerable quantities of water. Throughout the run, chlorine is determined daily on the vinylacetylene produced and the equivalent weight of hydrochloric acid is continuously added to the catalyst. In this manner, 98% to 100% of the weight of the acetylene consumed appears as vinylacetylene (crude); this crude vinylacetylene contains 80% to 100% vinylacetylene, 1% to 3% halogen derivatives and 0% to 20% of divinylacetylene and may be used as such or it may be purified by the simple process of fractional distillation. Under the conditions employed the duration of contact between acetylene and catalyst was from 8 to 15 seconds.

Example 5

The process of Example 1 is repeated but with the condensers replaced by an absorption tower held at −20° to 0° in which medicinal mineral oil is brought in contact with the gas stream by counter flow through a packed column or tower, the rate of flow being adjusted so that the oil is nearly saturated with vinylacetylene by the time it reaches the bottom of the tower and the effluent gas contains only a small percentage of vinylacetylene. The oil is then circulated from the absorption tower to a suitable still in which the vinylacetylene is volatilized and the oil rendered applicable for further use.

As will appear from the examples and prior applications, the method of carrying out the absorption may be varied to a large extent. For example, the acetylene may be introduced into the absorption mixture under pressure, and the pressure may be maintained upon such mixture for a suitable length of time to permit complete absorption and reaction. If desired, the reaction mixture may be kept at elevated temperatures to assist in carrying out the intended reactions.

It will be understood also that the conditions and reagents set forth in the above examples, which are merely illustrative, need not be adhered to rigidly. Thus the proportions of the catalyst mass may be varied as well as the ingredients. Air may or may not be present. The functional importance of each of the constituents of the aqueous catalyst as described by Nieuwland in application Serial No. 505,463, are acceptable to the present invention; the composition, as previously defined in that case, consisting of a cuprous salt, finely divided copper powder, a salt of a tertiary amine or ammonia, and water, with or without the addition of an inorganic acid.

For the purpose of the present invention, the water in the above catalyst may be all or in part replaced by an organic carboxylic acid which, when added to the catalyst mixture in place of the desired amount of water, does not precipitate the cuprous copper as an insoluble salt, and which has an ionization constant of $10^{-6}$ or greater. Mixtures of acids may be employed, and mixtures of organic acids with small amounts of inorganic acids may be used if desired as modifications of the catalyst described by Nieuwland in application Serial No. 505,463. Such organic acids as the following may be used: acetic, chloroacetic, formic, citric, tartaric, propionic, butyric and lactic.

It is therefore evident that any of the following reagents may be present in the catalyst in varying proportions:
(a) Cuprous salt
(b) Ammonium or tertiary amine salt
(c) Organic acid
(d) Water
(e) Inorganic acid
(f) Non-aqueous solvent
(g) Copper powder.

Of these elements (a) and (b) are essential, (e) and (g) are desirable for good operation. The presence of (f) is the essential condition of this invention and with or without (c) the non-aqueous solvent is employed to replace part or all of (d).

Therefore, although water and organic acids may be used in conjunction with the non-aqueous solvent, as indicated by the examples, they are not essential. When used, their quantities should be sufficient to impart convenient fluidity, but in general, this will be obtained by the non-aqueous solvent alone.

The function of the metallic copper powder is merely to insure that all of the combined copper be present in the cuprous state. As in the prior art processes already described, cuprous chloride may be replaced by other cuprous salts such as the bromide, iodide, and cyanide, but the chloride represents the preferred embodiment. A mixture of a cupric salt and a reducing agent may be substituted for the cuprous salt or the cuprous salt otherwise produced in situ, but it is best to have all of the copper salt reduced before starting.

Salts of ammonia and/or tertiary amines are present in all applications of this new catalyst; pyridine represents the preferred amine. In place of the ammonium or amine salt, free ammonia or amine may be added, it being neutralized and converted to a salt by the acid present. Further, it is not necessary that the amine constituent be a salt of the same acids as those which exist in the catalyst or those which form the anion of the copper salt. Thus, pyridine formate may be used in a catalyst which contains cuprous bromide as the cuprous salt and free hydrochloric acid, three different anions therefore being present in equilibrium. It is desirable for optima results, that the amount of ammonium or amine salt be sufficient to effect substantially complete saturation of the liquid phase and that the cuprous salt be more than sufficient for complete saturation. These conditions, however, are not essential. The following salts are examples of the ammonia or amine salts which may be used for this purpose:

Ammonium chloride
Ammonium bromide
Pyridine hydrochloride
Pyridine hydrobromide
Pyridine acetate
Quinoline hydrochloride
Diethylaniline hydrochloride
Diethylaniline formate
Diethylaniline acetate Similar salts of dimethylaniline, quinaldine, diethylmetanilic acid, etc.

It is believed, but not proved, that the amine salt forms a complex addition product with cuprous chloride and the rate of absorption (and reaction) of acetylene is determined in part by the solubility of the complex in the acid medium. On this basis, the organic acid may be functioning to improve the solubility of this complex cuprous salt in the catalyst mixture.

The non-aqueous solvents which we propose to use in place of water under the disclosure of this invention are inert solvents such as liquid polyhydric alcohols, such as, for example, glycol, diethylene glycol, glycerol and propylene glycol (preferably glycerol and glycol, and aliphatic partial ethers of polyhydric alcohols, such as the monoethylether of ethylene glycol; monobutyl ether of diethylene glycol, and diethylene glycol itself, which is a partial ether.

By the term "inert solvents" is meant a solvent for the catalyst, which solvent does not ionize in aqueous solution and is substantially inert with respect to the catalyst and the acetylene reaction it is desired to promote. Thus, aniline, as reacted with acetylene according to Nieuwland Patent No. 1,811,959 is not an inert solvent since its reaction with acetylene is the primary reaction catalyzed. It is however not intended to exclude by this definition those solvents which react to produce by-products to the primary reaction in such small quantities as not to interfere with the primary reaction and as to be only incidental thereto.

Temperatures and methods of operating these catalysts should be essentially the same as described in the previously filed applications and patents.

While the diameter of the tube in Example 4 above is described as one-sixth of its length, it will be understood that these dimensions may be widely varied. Tubes having a length of from 3 to 6 times a diameter adapted to permit contact over a period of from 8 to 15 seconds are preferred when temperatures of from 45° to 100° C. are employed.

As many apparent and widely different embodiments of this invention may be made without departing from the spirit thereof, it is to be understood that we do not limit ourselves to the foregoing examples or descriptions except as indicated in the following claims:

We claim:

1. A catalyst for acetylene reactions comprising a cuprous salt, a compound of the group consisting of salts of ammonia and tertiary amines together with a high boiling inert non-aqueous solvent for the cuprous salt.

2. A catalyst for acetylene reactions comprising a cuprous salt, a compound of the group consisting of salts of ammonia and tertiary amines together with a high boiling solvent of the group consisting of liquid polyhydric alcohols and aliphatic hydroxy ethers of polyhydric alcohols.

3. A catalyst for acetylene reactions comprising a cuprous salt, a compound of the group consisting of salts of ammonia and tertiary amines together with a polyhydric alcohol of the group consisting of glycol, ethylene glycol, diethylene glycol, glycerol and propylene glycol.

4. A catalyst for acetylene reactions comprising a cuprous salt, a compound of the group consisting of salts of ammonia and tertiary amines together with an aliphatic hydroxy ether of the group consisting of the monoethylether of ethylene glycol, the monobutylether of diethylene glycol and diethylene glycol.

5. A catalyst for acetylene reactions prepared from a cuprous salt, a compound of the class consisting of salts of ammonia and tertiary amines, together with a high boiling non-aqueous solvent of the group consisting of liquid polyhydric alcohols and aliphatic hydroxy ethers of polyhydric alcohols, and an amount of an inorganic acid (having an ionization constant of at least $10^{-6}$) in such excess of that amount equivalent to the base present as to establish a hydrogen ion concentration of at least pH 6 but not in such excess of said equivalent amount as to establish ionizable hydrogen over 0.2% of the weight of cuprous copper in the system, said acid being adapted to form a cuprous salt which is soluble in the mixture.

6. A catalyst for acetylene reactions comprising cuprous chloride and ammonium chloride in amounts to effect substantially complete saturation of the liquid phase together with a high boiling solvent of the group consisting of liquid polyhydric alcohols and aliphatic hydroxy ethers of polyhydric alcohols.

7. The method of producing from acetylene, hydrocarbons of higher molecular weight which comprises bringing the acetylene into contact with a catalyst mixture comprising a cuprous salt, a compound of the group consisting of salts of ammonia and tertiary amines together with a high boiling inert non-aqueous solvent for the cuprous salt.

8. The method of producing from acetylene, hydrocarbons of higher molecular weight which comprises bringing the acetylene into contact with a catalyst mixture comprising a substantially saturated solution of a cuprous salt and a compound of the group consisting of salts of ammonia and tertiary amines in a solvent of the group consisting of liquid polyhydric alcohols and aliphatic hydroxy ethers of polyhydric alcohols.

9. The improvement in the known methods of producing hydrocarbons of higher molecular weight from acetylene by bringing the acetylene into contact with an aqueous catalyst solution containing a cuprous salt and a compound of the group consisting of salts of ammonia and tertiary amines which improvement comprises replacing at least a portion of the water of the catalyst solution with a high boiling solvent of the group consisting of liquid polyhydric alcohols and aliphatic partial ethers of polyhydric alcohols.

10. The process of claim 8 wherein the temperature in the reaction zone is maintained at substantially from 45° to 100° C.

11. The process of claim 8 wherein the acetylene is passed in a continuous stream into contact with the catalyst, the effluent gases are cooled to effect removal of first the water and then the products of the reaction and the unreacted acetylene is returned to the catalyst.

12. The process of claim 8 wherein a stream of acetylene is contacted with the catalyst in a reaction zone at a temperature of from 45° to 100° C. for a period of from 8 to 15 seconds.

13. The method of producing from acetylene, hydrocarbons of higher molecular weight which comprises bringing the acetylene into contact with a catalyst mixture of the type set forth in claim 5.

14. The method of producing from acetylene, hydrocarbons of higher molecular weight which comprises bringing the acetylene into contact with a catalyst mixture of the type set forth in claim 3.

15. The process of claim 8 wherein a stream of acetylene is contacted with the catalyst in a reaction zone at a temperature of from 45° to 100° C. for a period of from 8 to 15 seconds and the catalyst comprises a mixture of 35.6 parts of cuprous chloride, substantially 13.8 parts of ammonium chloride, 4 parts of metallic copper powder, 85 parts of glycerol and 1.1 parts of 38% hydrochloric acid, which mixture has been aged for at least one-half hour at 50° C. to 60° C. under an atmosphere of nitrogen.

FREDERICK B. DOWNING.
ALBERT S. CARTER.
DONALD HUTTON.